United States Patent [19]

Nakano et al.

[11] Patent Number: 4,497,288

[45] Date of Patent: Feb. 5, 1985

[54] INTAKE DEVICE FOR AN ENGINE

[75] Inventors: Yoshikatsu Nakano, Saitama; Masaaki Matsuura; Minoru Akiyama, both of Tokyo, all of Japan

[73] Assignee: Honda Giken Kogyo Kabushiki Kaisha, Tokyo, Japan

[21] Appl. No.: 465,716

[22] Filed: Feb. 11, 1983

[30] Foreign Application Priority Data

Feb. 13, 1982 [JP] Japan .................................. 57-20667

[51] Int. Cl.³ .............................................. F02B 75/18
[52] U.S. Cl. .................................. 123/52 M; 123/432; 123/308; 123/579
[58] Field of Search ............... 123/52 M, 52 MB, 306, 123/308, 432, 579

[56] References Cited

U.S. PATENT DOCUMENTS

| 1,307,896 | 6/1919 | Colardeau | 123/52 MB |
| 3,087,480 | 4/1963 | Baudry | 123/432 |
| 3,505,983 | 4/1970 | Härtel | 123/52 MB |
| 4,104,881 | 8/1978 | Kogure et al. | 123/579 |
| 4,300,504 | 11/1981 | Tezuka | 123/52 M |

Primary Examiner—E. Rollins Cross
Attorney, Agent, or Firm—Sughrue, Mion, Zinn, Macpeak, and Seas

[57] ABSTRACT

An intake device for an engine including the first intake valve located at the downstream end of the first intake passage that is connected to the primary carburetor. A second intake valve is located at the downstream end of the second intake passage that is connected to the secondary carburetor in a cylinder. Both intake passages are connected to each other through a pathway situated in the middle of said intake passages. A check valve located in said pathway allows flow from the first intake passage to the second intake passage. In accordance with a second embodiment, the primary and secondary carburetors are configured so that operation of the secondary carburetor is a function of negative pressure in the primary system to remain closed under minimal load conditions.

4 Claims, 11 Drawing Figures

INTAKE DEVICE FOR AN ENGINE

BACKGROUND OF THE INVENTION

This invention relates to an intake device for an engine used in a motorcycle and other powered small vehicles, such as snowmobiles, and tricycles. In the conventional engine device of this type, a first air/fuel intake valve is located at the downstream end of the first intake passage that is connected to the primary carburetor. A second air/fuel intake valve is located at the downstream end of the second intake passage that is connected to the secondary carburetor. By connecting both air/fuel intake passages to each other through a pathway situated in the middle of said intake passages, when the secondary carburetor does not function, in order to improve combustion, a part of fresh air in the first intake passage is led from said primary carburetor to said secondary carburetor through said pathway to dilute residual gas in the second intake passway. Such a system has been proposed. However, in such a device, the air/fuel mixture is liable to be led to the first intake passage through the pathway at the time of its backflow. This would degrade rather than assist in engine performance during a partial malfunction.

SUMMARY OF INVENTION

It is an object of the present invention to provide an improved device overcoming these shortcomings of the prior art.

A feature of this invention is that the intake device includes the first air intake valve located at the downstream end of the first intake passage that is connected to the primary carburetor and the second air intake valve located at the downstream end of the second intake passage that is connected to the secondary carburetor. Both intake passages are connected to each other through a pathway situated in the middle of said intake passages. A check valve is located in said pathway and allows flow only from the first intake passage to the second intake passage.

The preferred embodiments of the present invention are hereinafter explained with reference to the attached drawing.

DESCRIPTION OF THE PREFERRED EMBODIMENT

Figure 1:
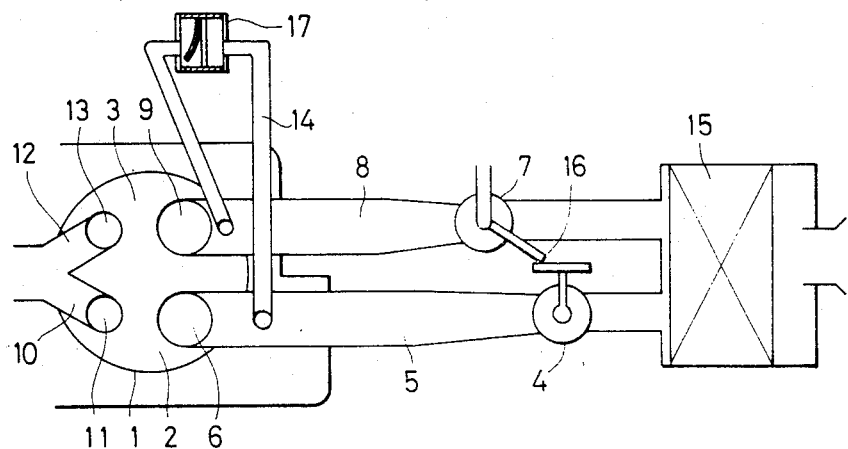
FIG. 1 is a plan view of a first embodiment of this invention.
Figure 2:
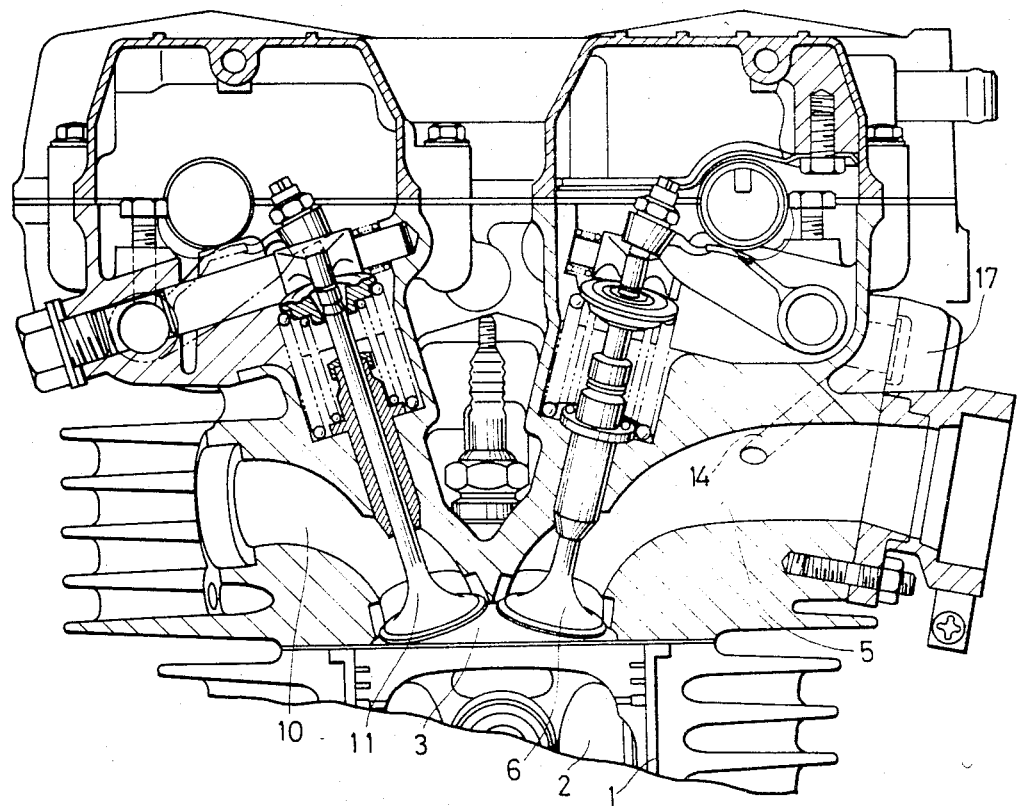
FIGS. 2 and 3 are partial sectional views of the intake side of the motor in accordance with a first preferred embodiment.
Figure 3:
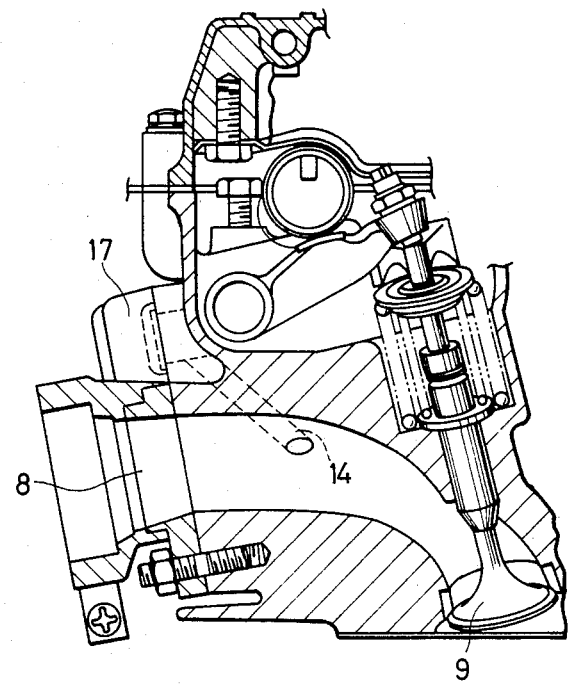
Figure 4:
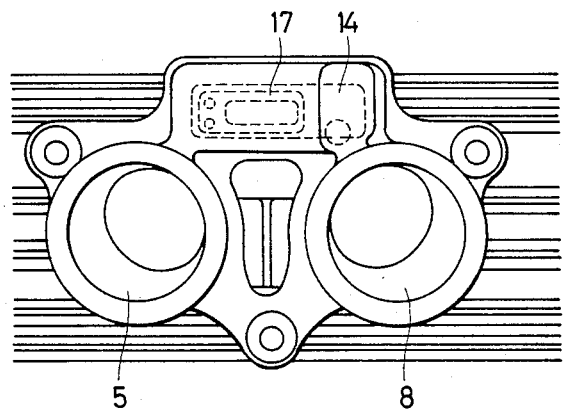
FIG. 4 is a sectional side view of a portion of the embodiment shown in FIG. 1 illustrating the reed valve placement.
Figure 5:
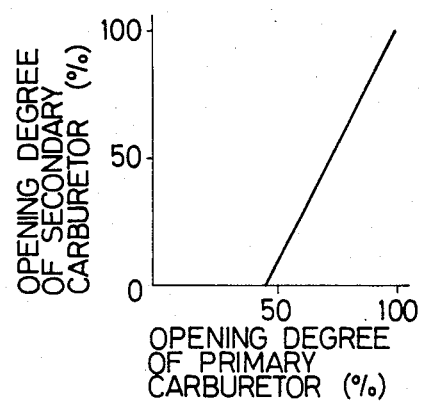
FIG. 5 is a diagram showing the interlocking relation between the primary and secondary carburetors.

Referring now to FIGS. 1, 2 and 3, element 1 is a cylinder in an engine, 2 is a piston in the cylinder, and 3 is a combustion chamber over the piston. The first intake valve 6 located at the downstream end of the first intake passage 5 that is connected to the primary carburetor 4. The second intake value 9 is located at the downstream end of the second intake passage 8 which in turn is connected to the secondary carburetor 7 that interlocks with the primary carburetor 4. These form, as shown in FIG. 4, a pair of intake passages on one side of the upper part of the combustion chamber 3. At the same time, the first exhaust valve 11 is connected to the first exhaust passage 10 and a second exhaust valve 13 is connected to the second exhaust passage 12. These valves are placed side by side on the other side of the combustion chamber 3. Furthermore, the aforementioned intake passages 5 and 8 are connected to each other through a pathway 14 situated in the middle of the passages. In FIG. 1, 15 is an air cleaner provided at the upstream end of both intake passages 5 and 8. Element 16 represents an interlocking device that interlocks both carburetors 4 and 7. These carburetors 4 and 7 are composed so that they interlock in the relation of opening, for example, as shown in FIG. 4. Other elements of the motor, such as the spark plug, valve lifters, bias springs, valve covers and the like, are illustrated in FIGS. 2 and 3 but not specifically recited herein since they are conventional and do not specifically form a part of this invention.

The system as defined above does not materially differ from a conventional device. However, in accordance with the first preferred embodiment of the present invention, a check valve 17, such as a reed valve, is provided. This valve allows flow from the first intake passage 5 to the second intake passage 8 and is provided in the pathway 14 as shown in FIG. 4. The intake passages 5 and 8 run generally parallel to the cylinder and the pathway 14 is formed as a portion of a common component suitably bolted into position. The valve member 17 is operably disposed in that component acting as a one-way valve permitting flow from intake 5 to intake passage 8. When the secondary carburetor 7 does not function, a part of the fresh air that is inputted in the first intake passage 5 to the primary carburetor 4 is bled off to the second intake passage 8 through the check valve 17 in the pathway 14 to dilute residual gas in the intake passage 8 so that an improvement of combustion is obtained. While a reed valve is shown, it is apparent that other types of one-way valves may be employed.

In this first embodiment shown in FIGS. 1-4, both ends of the pathway 14 are situated in proximity to the intake valves 6 and 9. The end on the downstream side is located near the second intake valve 9 and opens nearly in a nearly tangential direction (FIG. 2) so that swirl is caused in the combustion chamber 3. Furthermore, the secondary carburetor 7 is located nearer to the intake valves than the primary carburetor 4 to reduce the cubic volume of the second intake passage 8 on the downstream side of the secondary carburetor 7 to a comparatively small value. Hence, the volume of residual gas sucked in the second passage 8 on the downstream side can be decreased as much as possible. In this case, the setting of the output characteristic can be made by bringing the opening and closing timing of the intake valves, diameter of the intake valves, diameter of the intake pipes or bore of the carburetors in the first and second intake passages 5 and 8 close to one another.

In operation, assume that the primary carburetor 4 functions and the secondary carburetor 7 does not function. A portion of fresh air in the first intake passage 5 on the downstream side that is provided through the primary carburetor 4 is led to the second intake passage 8 through the pathway 14 via valve 17 and dilutes residual gas in the intake passage 8. Thus, an improvement of combustion is obtained. In this embodiment of the present invention, since the check valve 17 is provided in the pathway 14, no air/fuel mixture can flow back to the first intake passage 5 through said pathway. In other words, the amount of backflow of intake air can be decreased and consequently, this increases output.

As described above, the first embodiment of the present invention obviates the inconvenience arising from such backflow to increase output with a check valve provided in the pathway between both passages, and has such advantages that the composition is simple and can be obtained at a low cost.

A second embodiment of this invention utilizes a different mode of operation but still retains the check valve system of the first preferred embodiment. An intake device is designed so that the primary carburetor functions first and then the secondary carburetor functions through the operation of the opening side of the accelerator operating unit; that is, the primary carburetor opens and operates initially and then the second carburetor opens and operates as demand so requires. In this case, a system is composed of the piston valve type in which each carburetor opens successively through the operation of said accelerator operating unit. However, in such system both carburetors open simultaneously by fully opening the accelerator operating unit. Thus, in the range of fully opened low-speed running of an engine, intake backflows through the carburetors and the output of the engine is liable to decrease instead of provide the desired power boost.

This embodiment of the invention is realized by forming the primary carburetor into a piston valve type having a piston valve that interlocks with the accelerator operating unit and forming the secondary carburetor into a variable venturi type which responds to negative pressure and has a negative pressure piston. The opening of a venturi is regulated with a control lever interlocked with the accelerator operating unit.

Figure 6:
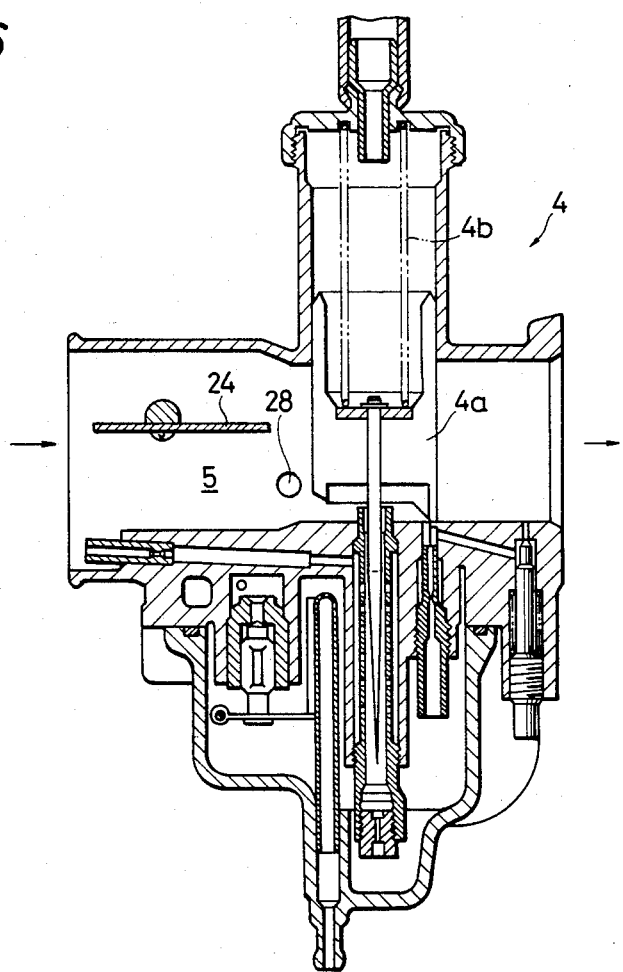
FIG. 6 is a sectional side view of a primary carburetor in accordance with a second embodiment.
Figure 7:
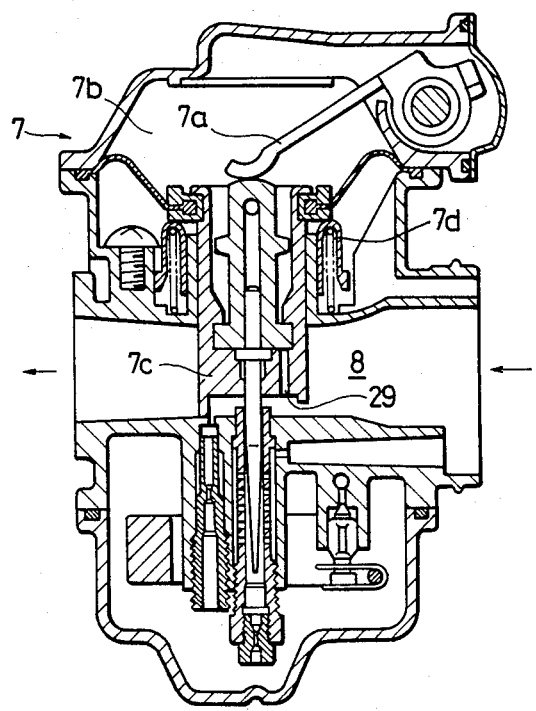
FIG. 7 is a sectional side view of a secondary carburetor in accordance with a second embodiment.

In this embodiment, as shown in FIGS. 6 and 7, the primary carburetor 4 is formed into a piston valve type having a piston valve 4a that opens and closes, interlocking with an accelerator grip (in the case of a motorcycle) or suitable other accelerator operating unit. The secondary carburetor 7 shown in FIG. 7 is formed into a variable venturi type, the opening of which is regulated with a control lever 7a at the upper part that interlocks with the accelerator operating unit, and responds to negative pressure. Specifically, the secondary carburetor has a negative pressure piston 7c that is actuated to the open side depending upon negative pressure in a negative pressure chamber 7b.

In operation, when the open side of the accelerator operating unit functions, the piston valve 4a is pulled and moves upward against a bias spring 4b. A choke valve 24 is provided on the upstream side of the piston valve 4a. When the accelerator operating unit opens more than a predetermined amount, the control lever 7a in the secondary carburetor is pulled by it and tilts, allowing the negative pressure piston 7c under the control lever 7a to lift by that amount. The piston 7c moves upward only when negative pressure in the negative pressure chamber 7b increases. In this embodiment, a spring 7d to jump the negative pressure piston 7c is provided around the piston 7c. Although the piston 7c should move upward when being pulled by negative pressure in the negative pressure chamber 7b, when the control lever 7a moves upward from its lower position, the piston 7c is designed to be affected first by the spring 7d. In other words, the piston 7c is pushed by the spring 7d and moves upward a little.

Figure 8:
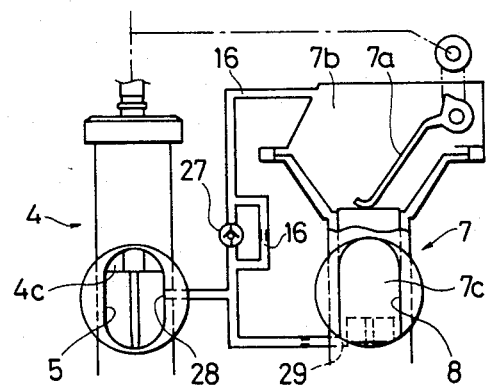
FIG. 8 is a side view of a negative pressure circuit of the second embodiment.
Figure 9:
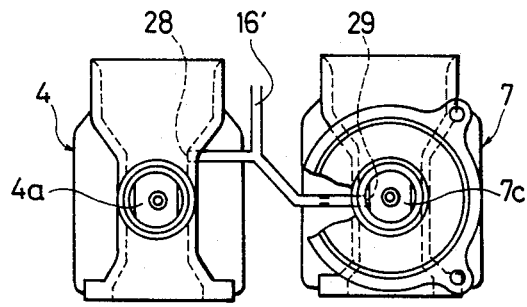
FIG. 9 is a plan view of a negative pressure circuit of the second embodiment.

More particularly, the inside of the negative pressure chamber 7b is formed to apply a compound negative pressure of the negative pressure in the first intake passage 5 and that in the second intake passage 8. The circuit to lead that negative pressure is, for example, shown in FIGS. 8 and 9. Specifically, the negative pressure pathway 16' to lead negative pressure to the negative pressure 7b has a check valve 27 having a leak jet 16 in the middle of the pathway 16 so that only the peak pressure of negative pressure in the upstream side of the check valve 27 is taken out. The upstream side branches into two portions. One is connected to a negative pressure outlet 28 of the choke bore located a little on the upstream side of the venturi of the primary carburetor 4 so that negative pressure on the primary side can be obtained from the position where fluctuations in pressure owing to the opening and closing of the piston valve 4a have little effect. A second pathway is connected to the atmospheric pressure side under the venturi of the secondary carburetor 7, that is, a negative pressure inlet 29 where negative pressure on the secondary side is not applied when the negative pressure piston 7c is closed. Thus, when the piston 7c is closed, negative pressure on the primary side leaks through it and compound negative pressure becomes comparatively low. When the piston 7c opens, compound negative pressure suddenly increases. With this system, it is easy to set the lift starting point of the piston 7c.

Figure 10:
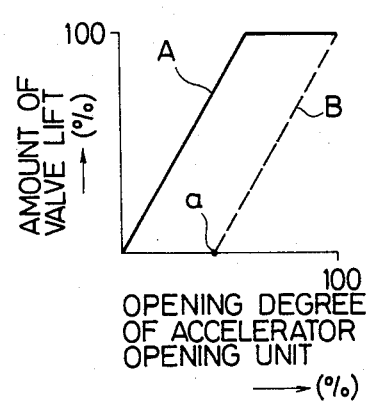
FIG. 10 is a diagram showing the opening characteristic of each carburetor.
Figure 11:
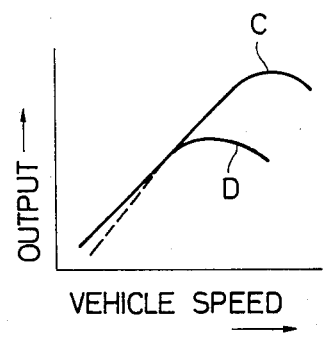
FIG. 11 is a diagram showing output characteristic.

Now the function of this second embodiment of the invention will be explained. The opening characteristics of the primary carburetor 4 and the secondary carburetor 7 are as illustrated in FIG. 10. Specifically, when the accelerator operating unit is controlled on the open side, the opening of the primary carburetor 4 is increased gradually as shown with the line A in FIG. 10, while the secondary carburetor 7 will not open at all until point a is reached. As the control lever 7a gradually moves upward, the opening that follows the line B is allowed. During this time, the opening of the secondary carburetor 7 is increased or decreasd according to negative pressure that acts on it. During high-speed running of the engine 1, the secondary carburetor 7 opens along the line B and acts as a high output type for the engine 1. During low engine speed or slow speed running under high load, the secondary carburetor 7 is closed to prevent intake from backflowing, thereby acting favorably for engine increasing output. This condition is illustrated in FIG. 11. As shown, the output characteristic of the engine 1 is shown by line C in the high-speed range and with line D in the low-speed range. No decrease in output as shown with dotted line in FIG. 11 occurs in the low-speed range.

As described above in accordance with this embodiment, the secondary carburetor is formed into a variable venturi type that responds to negative pressure. The secondary carburetor can be maintained closed at the time of high negative pressure and low speed running. Thus, the present invention has the effect of avoiding the above-mentioned inconveniences involved with the conventional type of intake devices whose secondary carburetor opens when not needed.

It is apparent that modifications of this invention may be practiced without departing from the scope of this invention.

What is claimed is:

1. An air intake device for an internal combustion engine comprising an air inlet, a cylinder having inlet valve means, a primary carburetor receiving air from said air inlet and delivering an air/fuel mixture to a first intake passage coupled to said inlet valve means; a secondary carburetor receiving air from said air inlet and delivering an air/fuel mixture to a second intake passage coupled to said inlet valve means; means establishing fluid communication between said first intake passage and said second intake passage and, one-way valve means in said means establishing fluid communication allowing fluid from said first intake passage to said second intake passage.

2. The device of claim 1, wherein said one-way valve means comprises a check valve disposed in a housing positioned between said first and said second intake passages.

3. The device of claim 1, wherein an end of said means establishing fluid communication terminating in said second intake passage opens nearly tangential to the direction of fluid flow in said second intake passage to create swirl of said air/fuel mixture in said cylinder.

4. The device of claim 1, wherein said secondary carburetor is positioned closer to said valve means than said primary carburetor to reduce the cubic volume of fluid in said second intake passage.

* * * * *